United States Patent [19]
Depue

[11] Patent Number: 6,123,349
[45] Date of Patent: Sep. 26, 2000

[54] VEHICLE AIR SUSPENSION SYSTEM

[75] Inventor: Stephen Lindsay Depue, Calgary, Canada

[73] Assignee: Standen's Limited, Calgary, Canada

[21] Appl. No.: 09/288,707

[22] Filed: Apr. 9, 1999

[51] Int. Cl.[7] .................................................. B60G 7/00
[52] U.S. Cl. ........................... 280/124.106; 280/124.125; 280/124.128
[58] Field of Search ...................... 280/124.106, 124.125, 280/124.128, 124.153

[56] References Cited

U.S. PATENT DOCUMENTS

| | | |
|---|---|---|
| 2,874,956 | 2/1959 | La Belle . |
| 3,630,541 | 12/1971 | Carlson et al. . |
| 3,734,482 | 5/1973 | Duchemin . |
| 3,782,753 | 1/1974 | Sweet et al. . |
| 3,844,579 | 10/1974 | Cunha . |
| 4,162,090 | 7/1979 | Schwartz . |
| 5,112,078 | 5/1992 | Galazin et al. ......................... 280/711 |

*Primary Examiner*—Brian L. Johnson
*Assistant Examiner*—Faye M. Fleming

[57] ABSTRACT

A suspension assembly is provided for positioning a wheel support axle below the frame of a vehicle. The assembly comprises a support bracket extending downwardly from a vehicle frame, with a trailing arm pivotally mounted to said bracket and extending therefrom to the axle. The trailing arm is secured to the axle by means of a top, U-shaped clamping member mounted over the trailing arm and having side legs with recessed portions adapted to snuggly mate with the axle and a bottom plate adapted to fit snuggly within the U-shaped clamping member between the side legs and being located between the trailing arm and the U-shaped clamping bracket. A pin projects from a surface of the trailing arm and mates with a hole in the top, U-shaped clamping member or the bottom plate to hold the axle and trailing arm assembly against relative movement in a direction generally along the longitudinal axis of the trailing arm. Welds secure the U-shaped clamping member sides legs to the bottom plate and welds securing the U-shaped clamping member side legs to the axle. An air spring is mounted between the axle and frame.

9 Claims, 2 Drawing Sheets

VEHICLE AIR SUSPENSION SYSTEM

BACKGROUND OF THE INVENTION

This invention relates to a vehicle air spring axle suspension system and, more particularly, to new and improved means for connecting an axle housing to a trailing arm.

Almost every type of vehicle has incorporated into its design a suspension system. The purpose of this suspension system is to reduce the level of transmitted load, shock and vibrations realized by the contents or passengers of the vehicle when it encounters rough terrain during its movement. Among such systems are coil springs, leaf springs, and pneumatic systems which employ the so called "air spring". The air spring basic components consist of an axle system (including tires and such), an air spring (loosely a sealed rubber bag) and its associated hardware, an air link beam or trailing arm pivotally connecting the axle to the vehicle frame and all of the nuts and bolts, brackets etc. that hold all of the pieces together.

The air spring market is highly competitive with the result that all manufacturers are looking for ways of reducing both weight and cost of the air suspension system. Thus, designers of air suspension systems have already gone through the exercise of minimizing the size of virtually every component while maintaining an acceptable safety factor.

One typical air suspension system is shown in Schwartz, U.S. Pat. No. 4,162,090, issued Jul. 24, 1997. This shows a vehicle axle suspension assembly that includes a locator plate that is welded to the axle housing and also heat shrunk onto the trailing arm. However, this arrangement still requires U-bolts that extend around the axle for securely clamping the axle to the trailing arm.

Another form of connection between a trailing arm and axle is shown in Carlson et al., U.S. Pat. No. 3,630,541, issued Dec. 28, 1971. In this design the trailing arm has axle stop members to prevent relative movement between the trailing arm and the axle. However, once again U-bolts are used for securely clamping the axle to the trailing arm.

It is an object of the present invention to provide a suspension assembly which is lighter and requires even fewer components than those described in the prior art.

SUMMARY OF THE INVENTION

The present invention in its broadest aspect relates to a suspension assembly for positioning a wheel support axle below the frame of a vehicle. This assembly includes a support bracket extending downwardly from the vehicle frame, a trailing arm pivotally mounted to this bracket and extending to an axle and means for securing the trailing arm to the axle.

This means for securing the trailing arm to the axle includes a top, U-shaped clamping member mounted over the trailing arm and having side legs with recessed portions adapted to snuggly mate with the axle. A bottom plate is adapted to fit snuggly within the U-shaped clamping member between the side legs and is located between the trailing arm and the U-shaped clamping bracket. At least one pin projects from a surface of the trailing arm and mates with at least one hole in at least one of the top, U-shaped clamping member and the bottom plate to hold the axle and trailing arm assembly against relative movement in a direction generally along the longitudinal axis of the trailing arm. This assembly is then completed by weld beads extending along the connector edge between the U-shaped clamping member side legs and the bottom plate and weld beads securing the U-shaped clamping member side legs to the axle.

DESCRIPTION OF THE PREFERRED EMBODIMENTS

Preferably an arcuate collar member is first welded to the axle and then the U-shaped clamping member side legs are welded to this collar. Pins may extend from either the top or bottom face of the trailing arm or either the top or bottom face. These pins mate with holes extending into the U-shaped clamping member or the bottom plate or into both of these.

According to a preferred embodiment, the assembly of the invention includes a top plate which is secured to the bottom of an axle frame. Both the bracket which supports the trailing arm and the air spring itself are secured to this top plate. It is also preferable to include an additional plate which is fixed to the top of the U-shaped clamping member to provide a firm bottom support for the air spring.

It has been found that the assembly of this invention with its welded joints is less prone to becoming loose and causing failure than is a traditional U-bolt assembly. Also, eliminating the U-bolts and associated hardware reduces weight and allows for a simpler system and easier installation. The assembly of this invention can be pre-mounted on an axle assembly and this complete axle and air spring sub-assembly can then be mounted as a single unit onto the frame of a trailer or other vehicle.

BRIEF DESCRIPTION OF THE DRAWINGS

The foregoing and other important objects and desirable features inherent in an encompassed by the invention, together with many of the purposes and uses thereof, will become readily apparent from the reading of the ensuing description in conjunction with the next drawings, in which.

Figure 1:
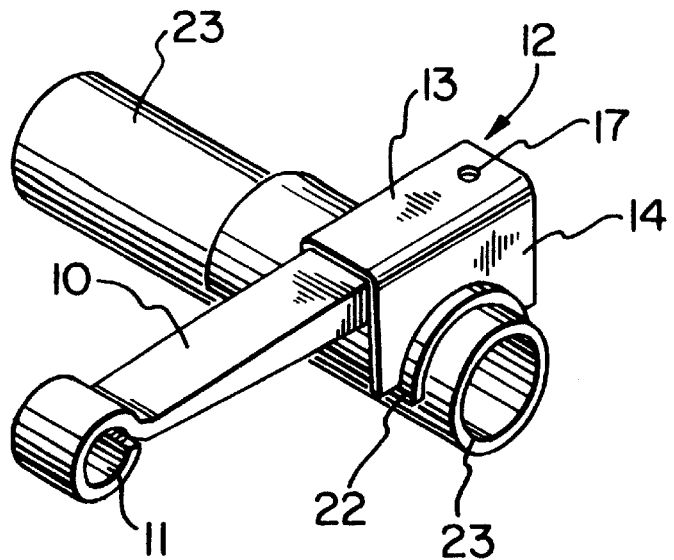
FIG. 1 is a perspective view of a trailing arm assembly according to the invention.
Figure 2:
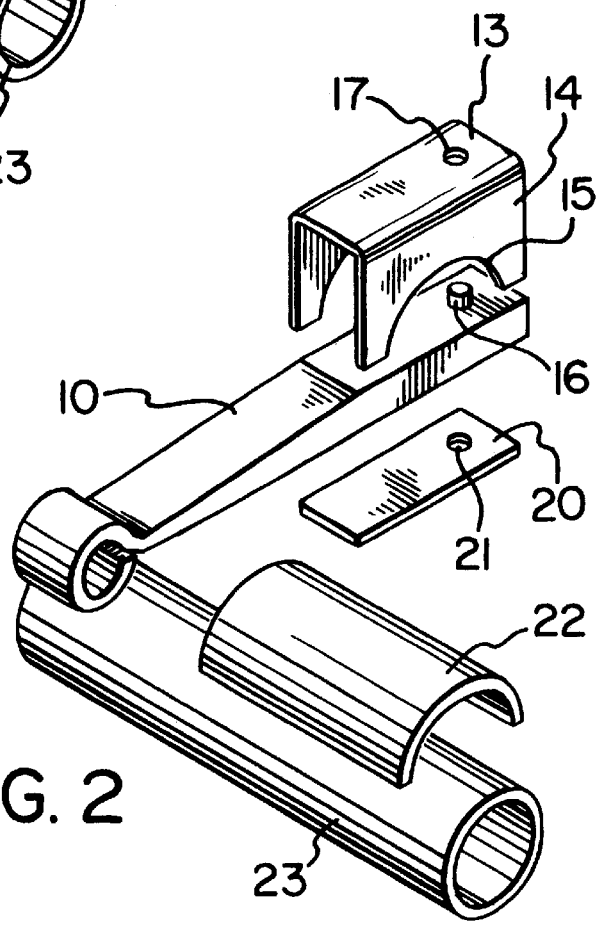
FIG. 2 is an exploded view of the parts of FIG. 1.
Figure 3:
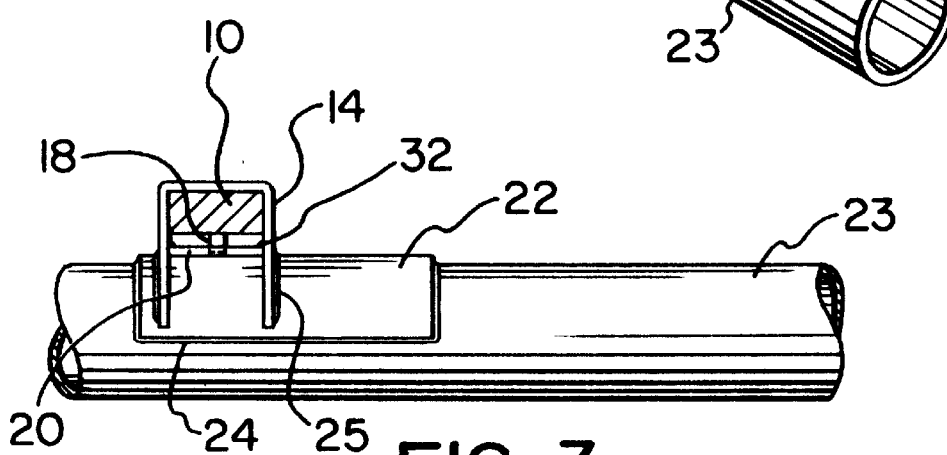
FIG. 3 is an elevation view of the assembly of FIG. 1.

The basic part of the assembly is shown in FIGS. 1 to 3. This shows a trailing arm 10 with a pivotal connector end 11. The trailing arm 10 is connected to an axle tube 23 preferably using an intermediate arcuate collar 22. This collar 22 is first welded to the axle tube 23 by way of an edge weld bead 24.

A U-shaped bracket 12 is placed over the trailing arm 10, this bracket having a top bridge portion 13 and downwardly extending side legs 14. The side legs include arcuate recesses 15 which are designed to snuggly mate either directly with the axle tube 23 or with the collar 22 fixed over the axle tube. A bottom plate 20 is placed below the trailing arm such that the trailing arm is snuggly sandwiched between the U-shaped bracket bridge portion 13 and the plate 20 as illustrated in FIG. 3. Pin 16 extending upwardly from the top face of trailing arm 10 mates with a hole 17 in the bridge portion 13 of the U-shaped bracket 12 and the trailing arm 10 may also include a downwardly directed pin 18 for mating with the hole 21 in the bottom plate 20. These are designed to hold the axle and trailing arm assembly against any relative movement in a direction generally along the longitudinal axis of the trailing arm 10. The bottom plate 20 is rigidly fixed to the side legs 14 by way of weld beads 32 extending along the corners between the bottom of the bottom plate 20 and the inside faces of the side legs 14. It is important that those welds 32 do not contact any part of the trailing arm within the U-shaped bracket 12. The trailing arm 10 is made of heat-treated spring steel and welds on this material tend to crack, resulting in failure of such a connection. This problem is avoided according to the present invention by the assembly using the bracket 12, plate 20 and pin 16, with welds only between the plate 20 and bracket 12.

Finally, the edges formed between the arcuate recess 15 of the side legs 14 and the arcuate collar 22 or the axle tube itself are welded together by means of the welding bead 25.

Figure 4:
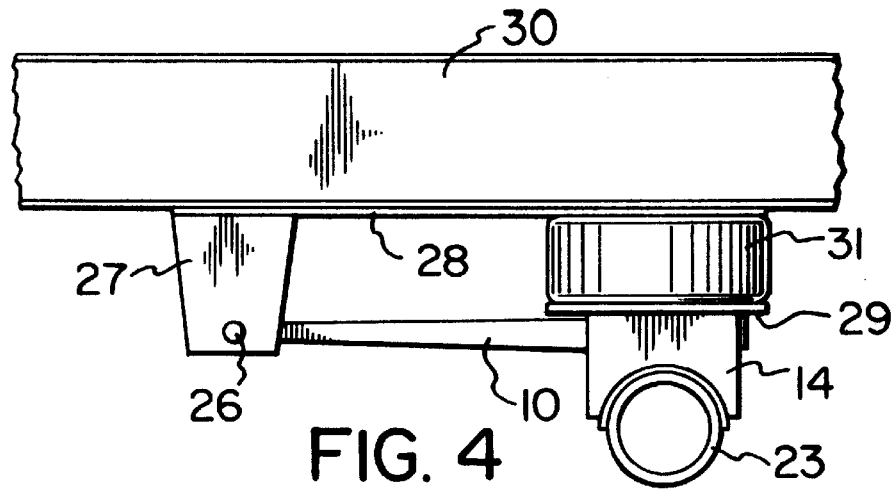
FIG. 4 is a side elevation of the assembly of FIG. 1 mounted on a vehicle frame.
Figure 5:
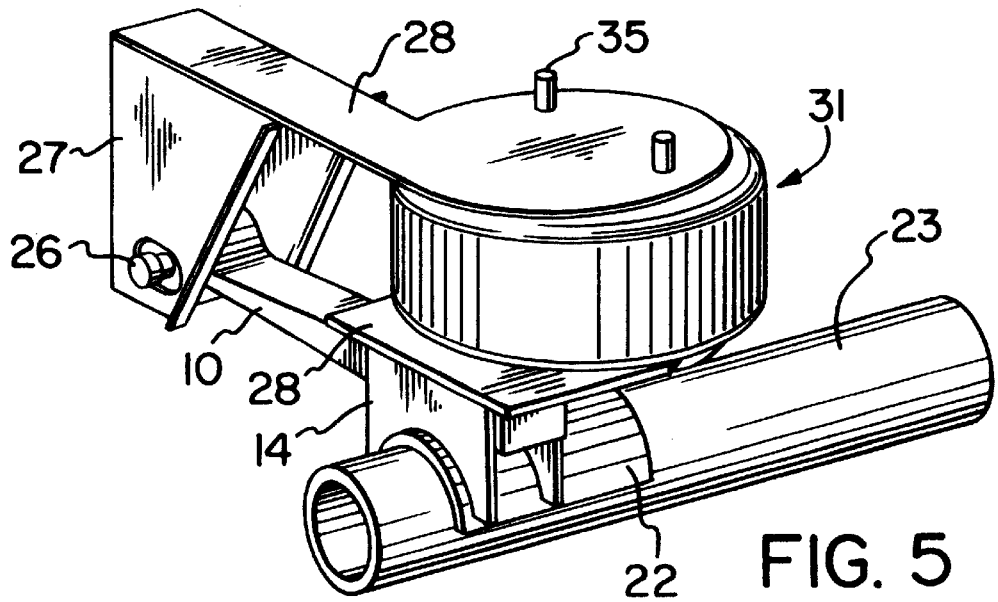
FIG. 5 is a perspective view of the assembly of FIG. 1 mounted on a frame.

A complete assembly is shown in FIGS. 4 and 5 including a bracket 27 with a pivot 26 for connecting to trailing arm 10. The bracket 27 is fixed to a support plate 28 which is in turn mounted below the frame 30 of a vehicle. Also mounted on top of the U-shaped bracket 12 is a support plate 28 for supporting the bottom of an air spring 31. The air spring is also connected to the top support plate 28.

This complete assembly as shown in FIGS. 4 and 5, including axle 23, may comprise a prefabricated sub-assembly sold as an assembled unit. This sub-assembly is then quickly and easily connected to a frame 30 by means of bolts 35.

Figure 6:
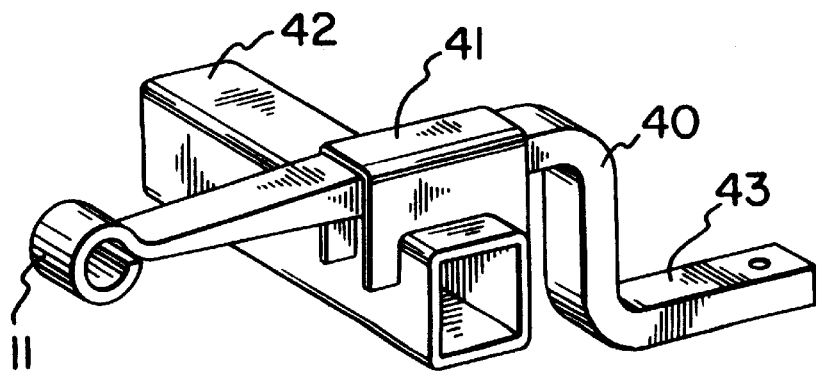
FIG. 6 is a perspective view of an alternative form of trailing arm assembly according to the invention.

FIG. 6 shows an alternative form of trailing arm 40 connected to an alternative square form of axle tube 42. For this design, the shape of the U-shaped bracket 41 is modified to snuggly fit around the square axle tube 42. The outer end of arm 40 has an offset portion 43 above which the air spring may be mounted.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A suspension assembly for positioning a wheel support axle below the frame of a vehicle, said assembly comprising: a support bracket extending downwardly from a vehicle frame, a trailing arm pivotally mounted to said bracket and extending therefrom to the axle and means for securing the trailing arm to the axle comprising a top, U-shaped clamping member mounted over the trailing arm and having side legs with recessed portions adapted to snuggly mate with the axle, a bottom plate adapted to fit snuggly within the U-shaped clamping member between said side legs and being located between the trailing arm and the U-shaped clamping bracket, at least one pin projecting from a surface of the trailing arm and mating with at least one hole in at least one of the top, U-shaped clamping member and the bottom plate to hold the axle and trailing arm assembly against relative movement in a direction generally along the longitudinal axis of the trailing arm and welds securing the U-shaped clamping member sides legs to the bottom plate and welds securing the U-shaped clamping member side legs to the axle.

2. A suspension assembly according to claim 1 wherein an arcuate collar member is welded to the axle and the U-shaped clamping member side legs are welded to said collar.

3. A suspension assembly according to claim 1 wherein an air spring is mounted between the axle and the frame.

4. A suspension assembly according to clam 3 wherein a plate is fixed on top of the U-shaped clamping member for engagement with the air spring bottom.

5. A suspension assembly according to claim 4 wherein the air spring is supported by a support plate fixed to the top thereof, said support plate also supporting the trailing arm bracket, said support plate being adapted for mounting under the frame of a vehicle.

6. A suspension assembly according to claim 1 wherein the trailing arm has a pin extending from the bottom thereof and engaging a hole in said bottom plate.

7. A suspension assembly according to claim 1 wherein the trailing arm has a pin extending from the top thereof and engaging a hole in said U-shaped member.

8. A suspension assembly according to claim 1 wherein the trailing arm has a pin extending from both the top and bottom thereof to engage holes in both the U-shaped member and the bottom plate.

9. A suspension assembly according to claim 1 wherein the welds between the U-shaped clamping member side legs and the bottom plate do not contact the trailing arm being held between the U-shaped clamping member and the bottom plate.

* * * * *